(No Model.)
J. SMITH.
NUT LOCKING PLATE.
No. 253,638. Patented Feb. 14, 1882.
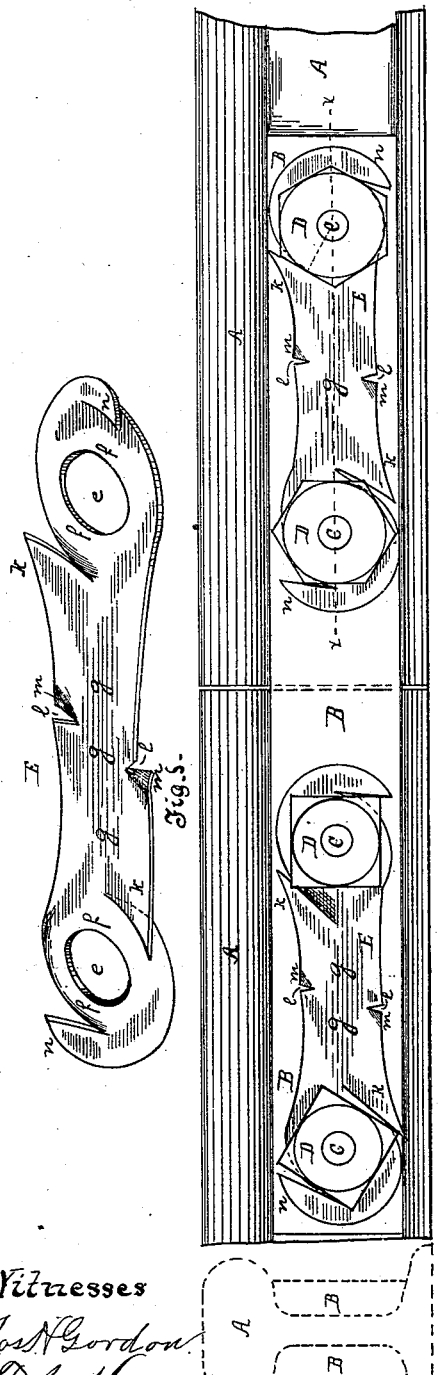
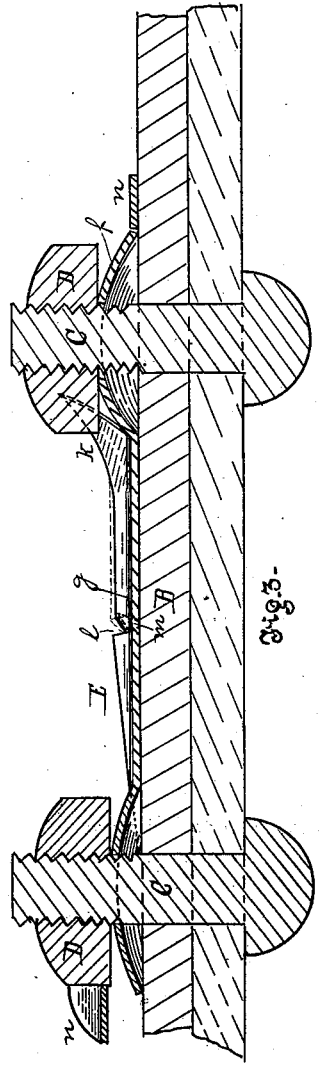
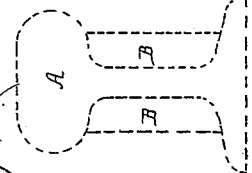
Witnesses
Jos. H. Gordon
F. J. Kay
Inventor
John Smith
by James L. Ray
Attorney

UNITED STATES PATENT OFFICE.

JOHN SMITH, OF VERONA, PENNSYLVANIA.

NUT-LOCKING PLATE.

SPECIFICATION forming part of Letters Patent No. 253,638, dated February 14, 1882.

Application filed December 7, 1881. (No model.)

*To all whom it may concern:*

Be it known that I, JOHN SMITH, of Verona, in the county of Allegheny and State of Pennsylvania, have invented a new and useful Improvement in Nut-Locking Plates; and I do hereby declare the following to be a full, clear, and exact description thereof, reference being had to the accompanying drawings, forming a part of this specification, in which—

Figure 1 is a perspective view of my improved nut-locking plate. Fig. 2 is a side view of a rail-joint, illustrating the use of the plate; and Fig. 3 is a longitudinal section on the line $x\,x$, Fig. 2, part only of the joint being shown.

Like letters of reference indicate like parts in each.

My invention relates to certain improvements in washers or plates for securing nuts on bolts to be used in securing railroad-joints, bridge-work, and like connections. Heretofore many different devices have been employed for this purpose, there being, among others, a metal plate, which fitted over the bolt, and had a spring-lip adapted to spring up along one edge of the nut and prevent its screwing off.

The object of my invention is to so improve the construction of these spring locking-plates as to make them sure of action and enable them to lock different sizes and shapes of nuts at many different parts of their turn, and thus adapt them more perfectly for use in machinery.

It consists, first, in a nut-locking plate adapted to fit over two adjacent bolts, and having at each end a spring-lip the edge whereof extends into the plate beside the bolt-hole diagonally of the length of the plate, and a supplemental spring-lip at the outer end of the plate, the edge of this lip being arranged to catch the nut at a different part of its turn from the other lip; and, second, in certain other details of construction hereinafter set forth.

To enable others skilled in the art to make and use my invention, I will describe its construction and operation.

My invention is illustrated in connection with a rail-joint, A A' being the meeting-rails, B the fish-plate, C the bolts, and D the nuts, all of which are of the ordinary construction.

E is my improved locking-plate, which is formed of sheet-steel, and is arranged to lock two adjacent nuts, so that two of the plates are employed at each rail joint. It has the bolt-holes $e$, which fit over the bolts D, the metal around these holes being pressed up so as to form cone-shaped or convex washers $f$, against which the nuts press when screwed up, and which prevent the rattling of the joint or the stripping of threads. The plate between these washers is formed slightly hollowed or concave, as at $g$, so as to give strength to the plate and prevent its being bent out of shape in handling or use, as well as to render the bending up of the spring-lips easier.

At the upper side of the right-hand washer and lower side of the left-hand washer are the spring-lips $k$, the edges of which extend diagonally along the side of the washers or bolt-holes into the plates, the lips being bent up from about the center of the plate. The edges of the lips are made diagonal to the length of the plate, so that they may extend past the center of the washers without so cutting into the plate as to weaken it, and thus be enabled to lock square, hexagonal, or other angular nuts, as well as different sizes of these nuts, the nuts catching by means of the sides or corners against the lips. By cutting the lip into the plate diagonally it is more easily bent up, it being practically impossible to bend the lip up sufficiently and impart to it the proper spring or elasticity in plates for locking two nuts where it is cut into the plate at right angles thereto.

In order to insure the springing back of the lip $k$, the edge of the plate is cut into at $l$ a short distance back of the spring-lip, and the corner nearest the lip is bent down, so as to rest against the fish-plate and form a fulcrum, $m$, which serves to hold the spring-lip up in place whenever the plate is pressed tight to place by the nuts.

Instead of cutting the plate to form the fulcrum, it may be swaged down at the proper point, so as to form a lug which presses against the fish-plate.

As the spring-lip $k$ is only adapted to lock the nut on each turn as many times as it has faces or sides, as on a quarter, sixth, or eighth turn, and it is often desirable to lock it when not in position to be held by the lip, I provide the plate with an auxiliary spring-lip, $n$, on the opposite side of the washer at each end of the plate. The edge of this lip n extends into the plate at a different angle from the lip k, so that but a slight turn of the nut will be necessary to catch against and be held by one or the other spring-lip.

The plate, shaped as above described, can be rapidly formed by means of suitable dies in a press.

My improved locking-plate is used in the following manner: After the parts to be joined have been placed together the bolts are passed through the rail and fish plates or other parts to be connected, and the locking-plate is placed over two adjacent bolts. The nuts are then screwed on in the usual manner, the lower face of the nut pressing down the spring-lips as it passes over them and the lips springing up as soon as freed from the nuts. If the nut is not screwed up as tightly as desired when it is caught and held by the lip k, it is turned a short distance farther around until caught and held by the auxiliary lip n, the two lips serving together to lock the nut in from eight to sixteen positions during one turn. The convex washers at the ends of the plate act as spring-washers and enable the nuts to be screwed up more tightly to place and prevent the rattling of the joint, taking up any slack if the joint should settle, as well as to give sufficiently to prevent the stripping of the nut or bolt threads on any sudden pressure against them on the passing of a heavy train. As the plate is pressed tightly to place by the nuts the fulcrum-points m cause the spring-lips to be held up or spring back to place, and so insure their locking the nuts. These fulcrum-points also enable the lips to be bent down more easily as the nuts pass over them, or, when bent down, to screw off the nuts, it being only necessary to bend down the point and not the entire lip. As the edges of the spring-lips extend some distance beyond a line at right angles to them through the center of the bolt-hole, they are enabled by this longer face or edge to lock different-sized nuts, the larger nuts locking with their faces parallel with the edges of the lips, or nearly so, and the corners of the smaller ones catching at different points along the edge, according to the size of the nuts. This greatly extends the usefulness of the locking-plates, enabling them to be used with nuts of different sizes and different shapes.

The nuts are removed in the usual manner after pressing down the lips by means of a lever-bar, which catches on one side of the rail, and has arms which press down the lips, thus freeing the nuts from the plate.

What I claim as my invention, and desire to secure by Letters Patent, is—

1. The nut-locking plate E, adapted to fit over two adjacent bolts, and having the spring-lips k, the edges whereof extend into the plate beside the bolt-holes and diagonally of its length, and the auxiliary spring-lips n, the edges whereof are at a different angle from those of the spring-lips k, substantially as and for the purposes set forth.

2. The nut-locking plate E, adapted to fit over two adjacent bolts, and having the convex washers f, spring-lips k, the edges whereof extend into the plate diagonally of its length, and the auxiliary spring-lips n, having their edges differing in line from those of the spring-lips k, substantially as and for the purposes set forth.

3. A nut-locking plate having the spring-lip k extending into the plate beside the bolt-hole and diagonally of the length of the plate, and the fulcrum-point m, adapted to hold up the spring-lip, substantially as and for the purposes set forth.

4. The locking-plate E, adapted to fit over two adjacent bolts having convex washers f at each end, being formed concave in its length, as at g, between said washers, and having spring-lips k, the edges whereof extend into the plate beside the washers and diagonally of its length, substantially as and for the purposes set forth.

In testimony whereof I, the said JOHN SMITH, have hereunto set my hand.

JOHN SMITH.

Witnesses:
F. G. KAY,
JAMES I. KAY.